US009299108B2

(12) United States Patent
Diana et al.

(10) Patent No.: US 9,299,108 B2
(45) Date of Patent: Mar. 29, 2016

(54) INSURANCE CLAIMS PROCESSING

(71) Applicant: Tata Consultancy Services Limited, Mumbai (IN)

(72) Inventors: Frank Diana, Somerset, NJ (US); Kevin Mulcahy, Flemington, NJ (US); Gary Menkin, East St. Johns, FL (US); Ajay Bhargava, Round Rock, TX (US); Ruchi Gupta, Pune (IN); Tumpa Bhattacharyya, Kolkata (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 13/774,027

(22) Filed: Feb. 22, 2013

(65) Prior Publication Data

US 2013/0226623 A1 Aug. 29, 2013

Related U.S. Application Data

(60) Provisional application No. 61/602,745, filed on Feb. 24, 2012.

(51) Int. Cl.
*G06Q 30/00* (2012.01)
*G06Q 40/08* (2012.01)
*G06Q 10/10* (2012.01)

(52) U.S. Cl.
CPC ............... *G06Q 40/08* (2013.01); *G06Q 10/10* (2013.01)

(58) Field of Classification Search
CPC ....... G06Q 40/00; G06Q 50/00; G06Q 20/00; G06Q 30/00
USPC ...................................... 705/3–44
See application file for complete search history.

(56) References Cited

U.S. PATENT DOCUMENTS

| | | | |
|---|---|---|---|
| 7,739,133 B1* | 6/2010 | Hail et al. .............. | G06Q 40/00 705/2 |
| 7,813,944 B1 | 10/2010 | Luk et al. | |
| 7,840,422 B1* | 11/2010 | Hail et al. ......... | 705/4 |
| 8,106,769 B1* | 1/2012 | Maroney et al. .............. | 340/540 |
| 8,260,639 B1* | 9/2012 | Medina, III ............ | G06Q 40/08 705/4 |
| 8,359,209 B2* | 1/2013 | McLaughlin .......... | G06Q 40/08 705/2 |
| 8,423,388 B1* | 4/2013 | Galusha ................ | G06Q 40/00 705/30 |
| 8,510,196 B1* | 8/2013 | Brandmaier ........... | G06Q 40/08 705/35 |
| 8,571,900 B2* | 10/2013 | Belhe ................... | G06Q 10/087 705/35 |
| 2004/0088198 A1* | 5/2004 | Childress et al. ................. | 705/4 |
| 2005/0108063 A1* | 5/2005 | Madill et al. ...................... | 705/4 |
| 2007/0282639 A1* | 12/2007 | Leszuk et al. ..................... | 705/4 |
| 2011/0015948 A1 | 1/2011 | Adams et al. | |
| 2011/0313794 A1* | 12/2011 | Feeney ............... | 705/4 |
| 2012/0330691 A1* | 12/2012 | Stepeck et al. .................... | 705/4 |

\* cited by examiner

*Primary Examiner* — Frantzy Poinvil
(74) *Attorney, Agent, or Firm* — Schwegman Lundberg & Woessner, P.A.

(57) ABSTRACT

Systems and methods for insurance claims processing in an insurance industry are described. The method comprises combining extracted claims data from one or more data sources to obtain a consolidated claims record and removing noise from text data of the consolidated claims record to obtain a claim dataset. The claims data comprises a plurality of claims. Further, ascertaining one or more suspicion indicators in the plurality of claims based on an analytical technique. Further, assigning a score to each of the plurality of claims based on at least one scoring rule. The score is an indicative of a level of suspicion of a claim. Furthermore, detecting at least one of insurance claims fraud and subrogation potential claims based on the score assigned to each of the plurality of claims.

20 Claims, 2 Drawing Sheets

INSURANCE CLAIMS PROCESSING

PRIORITY CLAIM TO RELATED APPLICATIONS

This patent application claims the benefit of priority to U.S. Provisional Patent Application Ser. No. 61/602,745, entitled "INSURANCE CLAIMS MANAGEMENT," filed on Feb. 24, 2012, which is hereby incorporated by reference herein in its entirety.

TECHNICAL FIELD

The present subject matter, in general, relates to systems and methods for insurance claims processing, and in particular, relates to detection of insurance claims fraud and claims having potential for subrogation.

BACKGROUND

Insurance may be defined as a contract between an insurer, known as an insurance company, and an insured, also known as a policy holder, in which compensation is paid by the insurer to the insured for some specific losses in exchange of a certain premium amount periodically paid by the insured in past. Whenever the insured suffers some loss for which he/she has insured or holds policy, the insured may file an insurance claim to demand compensation for the loss.

Sometimes, the insured may claim for a compensation for which the insured is not entitled. For example, the insured may deliberately plan a loss, such as theft, and car accident covered by the policy in order to receive compensation for the loss. Such situations are referred to as an insurance claim fraud. Further, in some situations, the insurance company may want to go for subrogation. In subrogation, the insurance company may recover expenses for a claim paid out by the insurance company when another party should have been responsible for paying at least a portion of that claim. For example, "Person A" is having car insurance from an "Insurance company B" and car of the "Person A" met with an accident because of "Person C". In such cases, the "insurance company B" will pay some amount to the "Person A" as per the car insurance, following which, the "Insurance company B" may sue "Person C" for his negligence, so as to recover some or whole of the amount paid to the "Person A". Hereinafter, the claims which have potential for subrogation may be referred to as subrogation potential claims. The insurance claims fraud and the subrogation potential claims may occur across different lines of business (LOBs).

SUMMARY

This summary is provided to introduce concepts related to insurance claims processing for detection of insurance claim frauds and subrogation potential claims in an insurance industry, in accordance with an implementation of the present subject matter. This summary is not intended to identify essential features of the claimed subject matter nor is it intended for use in determining or limiting the scope of the claimed subject matter.

In one implementation, Systems and methods for insurance claims processing in an insurance industry are described. The method comprises combining extracted claims data from one or more data sources to obtain a consolidated claims record and removing noise from text data of the consolidated claims record to obtain a claim dataset. The claims data comprises a plurality of claims. Further, ascertaining one or more suspicion indicators in the plurality of claims based on an analytical technique. Further, assigning a score to each of the plurality of claims based on at least one scoring rule. The score is an indicative of a level of suspicion of a claim. Furthermore, detecting at least one of insurance claims fraud and subrogation potential claims based on the score assigned to each of the plurality of claims.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

Figure 1:
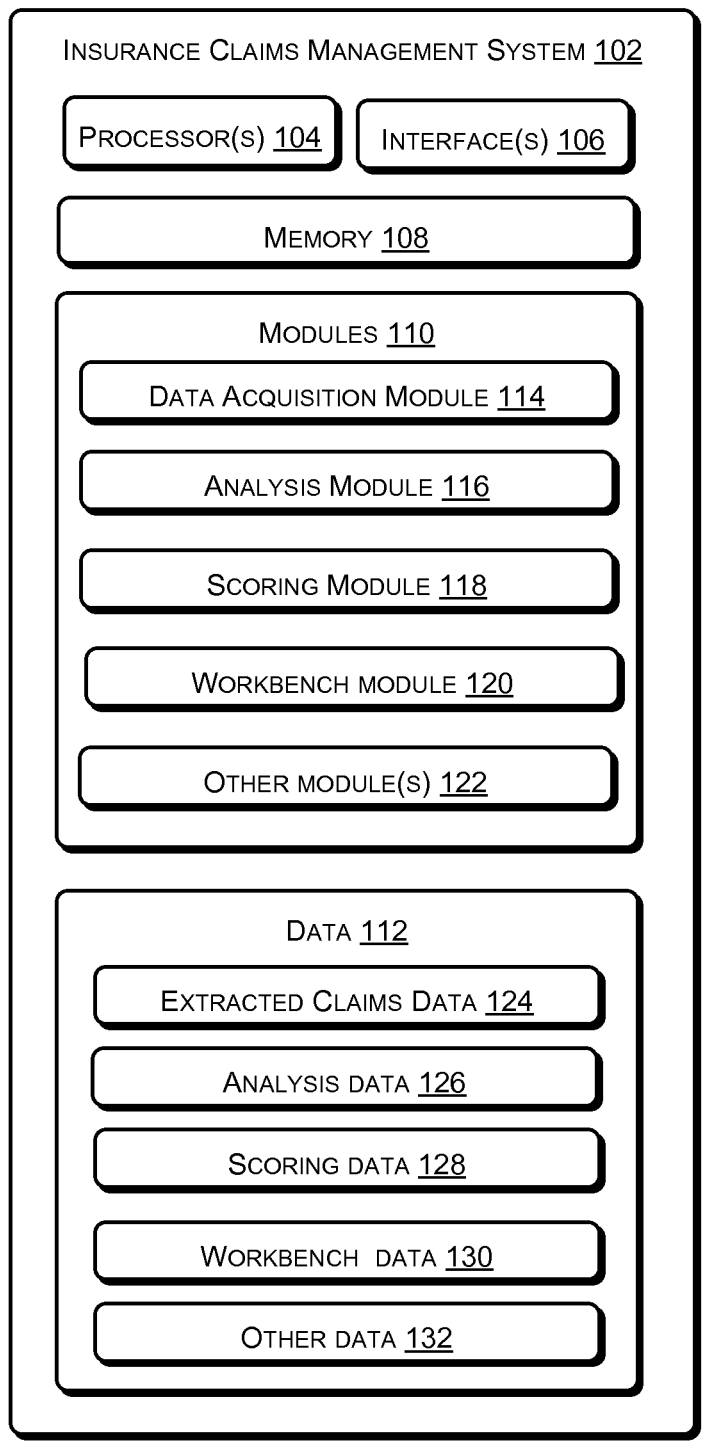
FIG. 1 illustrates a schematic implementation of an insurance claims processing system, in accordance with an embodiment of the present subject matter.

It should be appreciated by those skilled in the art that any block diagrams herein represent conceptual views of illustrative insurance claims processing system embodying the principles of the present subject matter

DETAILED DESCRIPTION

In the insurance industry, effective fraud detection requires rapid analysis of claims data stored in multiple sources. The claims data may be obtained from claims database and the wide variety of notes and documents associated with an insurance claim. To further complicate the issue, the average age of more than 70 percent of claim adjuster workforce is 45 and over, leading to a knowledge drain as experience is quickly leaving the industry. Also, detection of the insurance claims fraud and the subrogation potential claims is highly dependent on the expertise of the claim adjuster. In some situation, it is very much possible the claim adjustor may fail to identify the insurance claims fraud and the subrogation potential claims, which may prove to be costly to insurance companies. The insurance claims frauds and missed subrogation potential claims can affect the insurance companies in two ways. Firstly, the insurance companies have to spend heavily in investigating claims that may not be fraud or subrogation related, and secondly, the insurance companies have to pay compensation in situation where the insurance claim frauds and subrogation potential claims are not identified correctly.

Due to a vast presence of financial irregularities in insurance claims, insurance companies may suffer huge losses annually. In order to avoid such losses most of the insurance claims are typically analyzed for fraud before being cleared for payment by the insurance companies. In one conventional technique, analysis of the financial irregularities in the insurance claims is carried out manually by a Special Investigation Unit (SIU). As the investigation of the insurance claims carried out by SIU is manual, the investigation is tedious and highly time consuming.

Other conventional techniques rely on using a plurality of computing based systems for automatically detecting occurrences of such insurance claims frauds or subrogation potential claims. Such systems detect financial irregularities based on a structured claim data using either business rules or predictive modeling. The structured claims data may include policy date and claim date. Although automation improves the speed of detection of irregularities, it may miss the vast amount of suspicious text patterns in the claims data and overlook various hidden insights in unstructured data related to claims, such as claim notes, medical reports, police reports, emails, and web-based content. Further, predictive models used for the automated detection may not be accurate as the predictive models are typically based on only about one percent of claims that are considered to be fraudulent by the SIU. Therefore, the automated detection of financial irregularities may lead to high number of false positives and increase the cost of investigation.

In one embodiment of the present subject matter, systems and methods for insurance claims processing based on identification of one or more suspicion indictors in a plurality of claims using one or more analytical techniques, such as a text analysis, a predictive model analysis, a link analysis, a business rules analysis, and a social-media analysis are described. The present subject matter describes a rapid automated analysis of claims data contained in single or multiple data sources. The system, according to the present subject matter, can accurately detect fraudulent claims and claims with potential for subrogation in early stages of the claims lifecycle In one implementation, claims data may be extracted from one or more data sources. The claims data may include various data related to claims, such as policy name, policy number, name, address, reports, and type of accident. The one or more data sources may include internal and external data storage systems in an insurance organization, imaged content, and web content. The imaged content may include photos and scanned copies of claim related information, speech data recorded at the call center, etc.

The claims data extracted from different data sources may be subsequently combined to obtain a consolidated claims record. The consolidated claims record provides a 360 degree view of insurance claims. In one implementation, the imaged content and the speech data may be converted into text data while combining so that the imaged content and the speech data get combined with other text data easily. Thereafter, the consolidated claims record may be processed to remove any noise, such as spelling mistakes, punctuation errors, and grammatical errors present in the text data to obtain a claims dataset which is free from any kind of noise. The claims dataset may comprise a plurality of claims. Further, one or more suspicion indicators are ascertained in the plurality of claims based on at least one of a text analysis, a predictive model analysis, a link analysis, a business rules analysis, and a social-media analysis.

In the text analysis, presence of at least one text pattern is identified in the plurality of claims. In the predictive model analysis, the one or more suspicion indicators are ascertained based on structured attributes of claims, such as claim filed date, and policy effective date. In the link analysis, links between entities of different claims are analyzed to ascertain the one or more suspicion indicators. In the business rules analysis various rules are applied on the structured attributes of the claim to ascertain the one or more suspicion indictors in the plurality of claims. Further, in the social-media analysis, social-media associations between entities involved in the claims are identified to ascertain the one or more suspicion indicators.

In one implementation, the at least one text pattern, business rules, rules for identifying suspicious links between entities of two different claims, and rules for identifying social-media links may be obtained from a dictionary. The dictionary may also be referred to as a fraud dictionary. The dictionary may include concepts that are generally found in fraudulent claims and in claims having potential for subrogation. Further, the dictionary may be defined based on domain knowledge, expertise of claim adjusters, and specific LOB. In one implementation, the dictionary may be re-configured or multiple dictionaries may be used to suit different LOBs in the insurance industry.

Further, a score is assigned to each of the plurality of claims based on at least one scoring rule for detecting financial irregularities and subrogation potential claims. The score is an indicative of level of suspicion of a claim. In an example, higher the score of the claim, higher is the probability of insurance claims fraud and subrogation potential claim. The at least one scoring rule may comprise of one or more scoring parameters. The one or more scoring parameters may include a combination of rule name, client, line of business, suspicion indicators with associated weights, claim filtration criteria, and claims funnel for prioritizing the scored claims as per risk. Further, the at least one scoring rule may use business specific dictionaries for creating the suspicion indicators specific to financial irregularities that may occur in the business.

In one implementation, the plurality of claims may be classified into one or more categories using claims funnel based on scores assigned to the plurality of claims. In an example, the plurality of claims is classified into four categories: a tier 1, a tier 2, a tier 3 and a tier 4, based on the scores assigned to them. The tier 1 may include those claims that can be fast tracked as they do not show any suspicion. The tier 2 may include those claims with minimal signs of suspicion and may require analysis. The tiers 3 may include those claims with medium signs of suspicion and should be analyzed. The tier 4 may include claims with stronger signs of suspicion and therefore, should be analyzed or referred to SIU. Claims belonging to the tier 4 are highly suspicious and are therefore, reported for immediate attention. The claim filtration criteria helps in applying a prioritization criteria for selecting the claims which allows an analyst to analyze the claims with high suspicion first. Therefore, a fraud analyst may perform the analysis by selecting appropriate number of claims records depending upon his workload. The fraud analyst may be defined as a business user who will review the score assigned to the plurality of claims.

In an implementation, predictive modeling may be used for building a model based on claim attributes as well as refining the dictionaries specific to financial irregularities through data mining and statistical analysis of historical claims. The system includes a scoring workbench for maintaining the dictionaries and creating/editing the scoring rules. With the scoring workbench, a fraud specialist can reconfigure the dictionaries depending upon the LOB. The fraud specialist may be a business user with deep knowledge of fraud and who can understand fraud patterns. Further, an analyst workbench is provided in the system to review claims scoring results, perform detailed analysis and recommend further action. The fraud analyst can drill down and see the one or more suspicion indicators found in claims that can provide quick insights into the reason why a claim was found suspicious or why there is a potential for subrogation recovery. Appropriate actions such as referring claims for further investigation or processing for settlement/subrogation recovery can then be taken based on the tier in which the scored claims lie.

The system further includes an executive workbench that may be used for viewing reports and dashboards based on claims scoring results. Executive and supervisory users can use this workbench to review and communicate overall mitigation of financial irregularities/subrogation performance and business value delivered by the solution. The executive and supervisory users may also identify the insurance claims fraud and subrogation potential claims with the help of the executive workbench. Further, the system includes an administrative workbench which may be used for defining system defaults, setting security permissions and overall configuration of the system. In one implementation multilingual capabilities may provided to the analyst workbench, the executive workbench, and the administrative workbench so that a user may select the language as per his choice.

Therefore, user friendly workbench environment masks analytics complexity from business users. With the present subject matter, accuracy of identifying insurance claims fraud and subrogation potential claims is improved and number of false-positives and false-negatives are reduced. Further, the systems and methods employ machine learning from historical data for rapid refinement of dictionaries to improve the accuracy. The present subject matter also provides linkage to underlying details that enables analysts to understand the reasons for suspicion leading to high scores to determine course of action.

Figure 2:
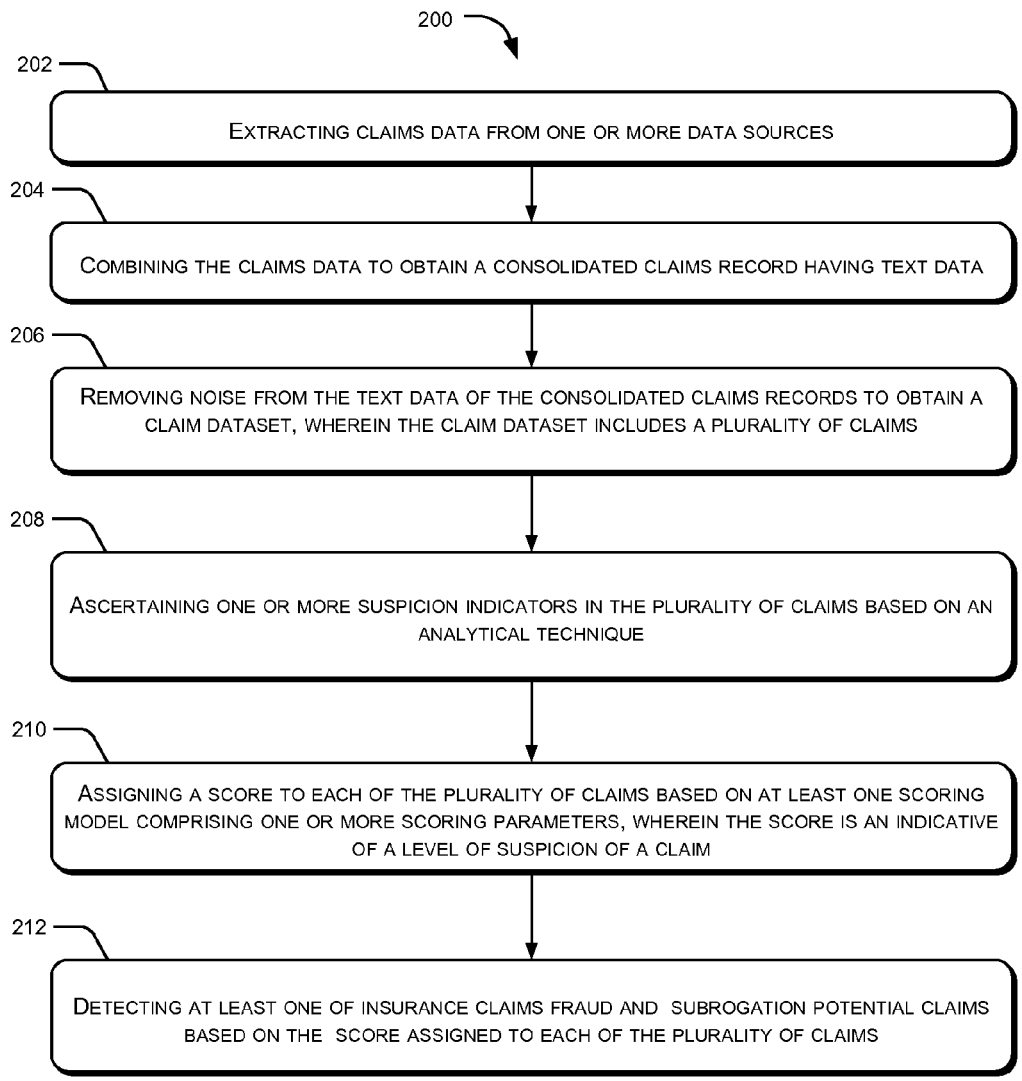
FIG. 2 illustrates a method of insurance claims processing for detecting insurance claims fraud and subrogation potential claim, in accordance with an aspect of the present subject matter.

The manner in which the systems and the methods for insurance claims processing has been explained in details with respect to the FIGS. 1 and 2. The systems and the methods may be used for identifying at least one of insurance claims fraud and subrogation potential claims. While aspects of described systems and methods for insurance claims processing to detect insurance claims fraud and subrogation potential claims may be implemented in any number of different computing systems, transmission environments, and/or configurations, the embodiments are described in the context of the following exemplary system(s).

FIG. 1 illustrates a schematic implementation of an insurance claims processing system 102, in accordance with an embodiment of the present subject matter. Hereinafter, the insurance claims processing system 102 may be referred to as the system 102. The system 102 described herein, can be implemented in any network environment comprising a variety of network devices, including routers, bridges, servers, computing devices, storage devices, etc. In one implementation the system 102 can be connected to one or more servers or databases (not shown in the figure), through a communication network (not shown in the figures). Such servers or databases may provide information about the details of the insurance claims and associated details.

The system 102 can be implemented as a variety of servers and computing systems. The servers and the computing systems that can implement the described method(s) include, but are not limited to, mail server, central directory servers, database server, file server, print server, web server, application server, and the like. The system 102 may also be implemented as a computing device, such as a laptop computer, a desktop computer, a notebook, a workstation, and a mainframe computer.

Further, the system 102 can be implemented in a network (not shown in the figure) that may be a wireless or a wired network, or a combination thereof. The network can be a collection of individual networks, interconnected with each other and functioning as a single large network (e.g., the internet or an intranet or a cloud).

In one implementation, the system 102 includes processor(s) 104, interface 106 and memory 108. The processor(s) 104 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The interface(s) 106 may include a variety of software and hardware interfaces that allow the system 102 to interact with the entities of the network, or with other software. The interface(s) 106 may facilitate multiple communications within a wide variety of networks and protocol types, including wire networks, for example, LAN, cable, etc., and wireless networks, for example, WLAN, cellular, satellite-based network, etc.

The memory 108 may be coupled to the processor 104. The memory 108 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the system 102 may include modules 110 and data 112. The modules 110 and the data 112 may be coupled to the processors 104. The modules 110, amongst other things, include routines, programs, objects, components, data structures, etc., which perform particular tasks or implement particular abstract data types. In another aspect of the present subject matter, the modules 110 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The modules 110 may also be implemented as signal processor(s), state machine(s), logic circuitries, and/or any other device or component that manipulate signals based on operational instructions.

The modules 110 can be implemented in hardware, instructions executed by a processing unit, or by a combination thereof. The processing unit can include a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In an implementation, the modules 110 include a data acquisition module 114, an analysis module 116, a scoring module 118, a workbench module 120, and other module(s) 122. The other module(s) 122 may include programs or coded instructions that supplement applications or functions performed by the system 102. In said implementation, the data 112 includes extracted claims data 124, analysis data 126, scoring data 128, workbench data 130, and other data 132. The other data 132, amongst other things, may serve as a repository for storing data that is processed, received, or generated as a result of the execution of one or more modules in the module(s) 110. Although the data 112 is shown internal to the system 102, it may be understood that the data 112 can reside in an external repository (not shown in the figure), which may be coupled to the system 102. The system 102 may communicate with the external repository through the interface(s) 106 to obtain information from the data 112.

As mentioned before, the system 102 may be configured to detect fraudulent claims and claims having potential for subrogation early in the claims lifecycle. In one implementation of the present subject matter, the system 102 provides a 360 degree view of claims data, as the claims data is obtained from structured and unstructured data sources. The claims data may include various data related to insurance claims, such as policy number, policy holder name, address, reports, claim notes, medical reports, police reports, and emails. The system 102 further captures knowledge of domain specialists in dictionaries specific to different LOBs, such as general liability, worker compensation, auto, and property line of business. In one implementation, the system 102 may use a dictionary, specific to a line of business, for detecting financial irregularities in the insurance claims. For example, the system 102 may use the dictionary specific to mortgage fraud for detecting fraud in mortgage business.

In one embodiment of the present subject matter, the data acquisition module 114 may extract the claims data from one or more data sources. The one or more data sources may include internal and external data storage systems in an insurance organization which act as a source for claims related data. The one or more data sources may also include imaged content which contains photos and scanned copies of claim related information, speech data, and web content.

In one implementation, the data acquisition module 114 may extract the data from a claims database where claims related data is stored in the form of tables and fields. The extracted data may be either structured data or unstructured data. The structured data may include claim information as per a predefined format, such as policy number, policy effective date, policy expiry date, sum insured, insured name, sex, line of business, contact details, claim handler details, and claim approver details. The structured data may also include various demographic details, psychographic details, financial details, and claim history of a claimant that an insurer may be getting from external data vendors. The claimant may be defined as the insured who is claiming for the insurance. On the other hand, the unstructured data may include information provided by the claimant, for example, accident description, loss notes, information notes created by a customer care associate when the claimant calls and reports the event, transcribed text from recorded speech at call center, adjuster notes, claimant interview notes, and witness notes created by field investigators.

Further, the data acquisition module 114 may extract other textual data associated with the claims from sources outside the claims database also. For example, the data acquisition module 114 may extract the textual data stored in a document management system (DMS) or stored as files in a folder in different formats, such as word documents, PDF files, and notes having email communication between the claimant and the insurer. Extracting such textual data may provide valuable information about the claimant behavior and may prove to be very useful for discovering hidden fraudulent patterns in the claims.

Once the textual data has been obtained, the data acquisition module 114 also extracts imaged content and web content for detection of financial irregularities in the insurance claims. The imaged content may include documents which are scanned and stored, such as medical reports from a clinic and police reports (FIR) of an accident. The web content may include information posted on web pages. With the rise of social-media popularity, content may be used to supplement internal information and gain insights into fraudulent behavior. For example, the claimant may post information on a social networking sites about actual details of the accident which may significantly differ from the version provided to the insurer. In another example, medical practitioner who examined the claimant and prepared the medical report may be the claimant's friend on the social networking site. In another example, the claimant may be posting descriptions of physical activity that may be inconsistent with physical injuries claimed for worker's compensation benefits.

Once the claims data is extracted, the data acquisition module 114 may combine the claims data to obtain the consolidated claims record which provides a 360 degree view of claims. In some cases, text data in the claims data obtained may be in different languages. In such cases, the data acquisition module 114 may be configured to translate the text data of different languages to the language used in most of the claims data. For example, the data acquisition module 114 may translate the text data which is in French and Spanish to English before consolidating the claims data to obtain the consolidated claims record.

In one implementation, the consolidated claims record may contain noise in text data, such as grammatical mistake, spelling mistakes, and punctuation mistakes. The data acquisition module 114 may be configured to remove the noise from text data of the consolidated claims record to obtain a claims dataset. As may be understood by a person having ordinary skill in the art, the noise may be removed from the text data by using any conventional known technique. The claims dataset comprises a plurality of claims. Further, the data acquisition module 114 may provide synonyms for commonly words spelled differently during preparation of the data. For example, the term "web-site may" be also referred to as "website" at few places. In one implementation, the data acquisition module 114 may define abbreviation list for commonly used abbreviations. For example, "Customer Service Representative" for "CSR". In one implementation, the data acquisition module 114 may store the claims dataset in the extracted claims data 124.

In one implementation, the analysis module 116 may ascertain one or more suspicion indicators in the plurality of claims based on an analytical technique. The analytical technique may include a text analysis, a predictive model analysis, a link analysis, a business rules analysis, a social-media analysis, and a combination thereof. The suspicion indicator may be defined as a collection of concepts that can identify suspicious claim. A dictionary, also referred to as a fraud dictionary, comprises the concepts of insurance claims for identifying the suspicious claim. The concept may be defined as a person or a characteristic or an entity or an event that might be indicative of the suspicious claim and each concept is further represented by words or phrases or entities. Whenever the analysis module 116 determines the presence of these words or phrases in a claim it may ascertain the presence of the concept in the claim. In one implementation, the dictionary is stored in the analysis data 126.

In the text analysis, presence of at least one text pattern is identified in the plurality of claims. In one implementation, the at least one text pattern may represent financial irregularities and may be obtained from the dictionary stored in the analysis data 126. Thereafter, the analysis module 116 determines presence of the at least one text pattern in the plurality of claims. The claims in which the at least one text pattern is identified are considered as suspicious claims. In an example, if the analysis module 116 determines presence of words or phrases, such as stress, strain, sprain, swelling, contusion, soft, tissue, and injury, it implies the presence of the concept of soft tissue injury in the claims. In an implementation, similar concepts may be grouped together to form a concept category such as claimant related indicators and third party related indicators.

In one implementation, while performing the predictive model analysis the analysis module 116 may ascertain one or more suspicion indicators based on structured attributes of claims, such as claim filed date, and policy effective date. The analysis module 116 may use data mining and statistical techniques known in the art to ascertain the one or more suspicion indicators in the plurality of claims. For example, the analysis module 116 may identify that the insurance claim is filed by the insured just after few weeks from the date of registration for policy. Therefore, there is a suspicion indicator in the insurance claim that the insured may have planned for getting money from the insurer.

In one implementation, while performing the link analysis, the analysis module 116 may identify links between entities of different claims to ascertain the one or more suspicion indicators. For example, name of the medical expert may appear in more than one claim in the plurality of claims. In such a case, it may be possibility that the medical expert is providing fake medical certificates to the insured to get the insurance amount.

Furthermore, while performing the business rules analysis, the analysis module 116 may identify the one or more suspicion indicators based on various rules applied on the structured attributes of the claims. For example, the insured has claimed for the car insurance more than once in the same year. In such cases, it may be possible that the insured is deliberately damaging his car to get money from the insurance companies. In an implementation, the rules are defined by the insurance and may be obtained from the dictionary.

While performing the social-media analysis, the analysis module 116 may ascertain social-media associations between entities involved in the claim to ascertain the one or more suspicion indicators. For instance, in the previous example of the medical expert being a friend of the insured on a social-media website, the analysis module 116 may ascertain the claim to be possibly fraud. In an implementation, the analysis module 116 may store results of the predictive model analysis, the link analysis, the business rules analysis, and the social-media analysis in the analysis data 126.

Upon analysis of the claims by the analysis module 116, the scoring module 118 may assign a score to each of the plurality of claims based on at least one scoring rule having one or more scoring parameters. The scoring parameters may include a combination of rule name, client, LOB, the suspicion indicators, the claim filtration criteria, and claims funnel. The suspicion indicator is a collection of concepts to identify a suspicious claim. For example, collection of concepts, such as "an un-witnessed event", "soft tissue injury", "does not have health insurance", "unemployed", "prior medical history", "prior claim(s)", and "anxious to settle", is a suspicion indicator. Further, the scoring module 118 may provide various capabilities, such as creating new scoring rules, copy scoring rule, modify scoring rule, and delete scoring rule.

The scoring module 118 may be configured to receive inputs from a domain expert to assign a weight to each of the suspicion indicators based on the severity of the suspicion indicator. In an example, the weight assigned to "First notice from attorney on day of accident" suspicion indicator may be 7 as the notice is sent on the day of accident and that generally means the accident is staged. Whereas, the fraud indicator "Same doctor/lawyer pair routinely handles claims together" has a weight of 2, as it may or may not be intentional and hence, one cannot say whether the claim is fraudulent or not. In one implementation, the actual suspicion indicators and the weight associated with the suspicion indicator may be based on the client, line of business, and scoring rule. For instance, a specific fraud indicator may come under different line of business with same or different weight associated with it. In one implementation, the scoring module 118 may calculate the score based on Equation 1 given below.

$$\text{Score} = \text{Sum}(\text{suspicion indicator weights}) \quad (1)$$

In one implementation, the score assigned to the plurality of claims may be stored in the scoring data 128. The score is an indicative of a level of suspicion of a claim. In one implementation, higher the score of the claim, higher is the probability that the claim is a suspicious claim. Based on the score of a claim, the scoring module 118 may categorize the plurality of claims into a claims funnel to prioritize the plurality of claims. This may help in determining claims with highest suspicion. For the purpose, the scoring module 118 may categorize the claims into one or more categories within the claims funnel. In an example, the scoring module 118 may classify the plurality of claims into the claims funnel with four categories: a tier 1, a tier 2, a tier 3, and a tier 4, based on the scores assigned to them. The tier 1 may include those claims that can be fast tracked as they do not show any suspicion. The Tier 2 may include claims with minimal signs of suspicion and may require analysis. The tier 3 may include claims with medium signs of suspicion and should be analyzed. The tier 4 may include claims with stronger signs of suspicion and therefore, should be reported for immediate attention.

In one implementation, the scoring module 118 may employ a claim filtration criterion which allows a user to select the claims to be scored and accordingly, adjust the claims volume depending on workload.

As mentioned above, the scoring module 118 may be configured to create and edit scoring rule based on input received from the user. This may prove very useful because the scoring rule is specific to a client and line of business. For example, for a specific client and line of business, the scoring module 118 may help in creating new scoring rules having their own set of suspicion indicators and associated weights. In an implementation, the scoring module 118 may recalculate the score assigned to the plurality of claims in case new information about the claims has been received, which may change the score.

Further, it may be possible that the dictionaries may become outdated over a period of time and may require some changes to be in sync with changing/new patterns of frauds/subrogation. In such cases, the scoring module 118 uses predictive modeling for scoring claims based on data mining techniques. The scoring module 118 may also use machine learning techniques to learn new patterns from fraudulent claims and subrogation claims. These patterns can then be added as new concepts to the dictionaries.

In an implementation, the workbench module 120 may provide a scoring workbench for maintaining the dictionary and managing the scoring rules. The scoring workbench allows a fraud specialist to update the dictionaries and create or edit or delete the scoring rules. Further, workbench module 120 provides an analyst workbench to a fraud analyst for analyzing the results of claims scoring process. The workbench module 120 illustrates the one or more suspicion indicators in the plurality of claims upon receiving a drill down request from the fraud analysts Further, once the drill down request is received, the analyst workbench provided by the workbench module 120 may allow the fraud analyst to drill down to the claims information and look at the patterns found in claims dataset based on which the score has been generated. Further, by using the analyst workbench, the user can review the claims triaged into different tiers based on the score.

In an implementation, the workbench module 120 may provide an executive workbench which may be used by supervisory and senior management users for reviewing various claim, fraud and subrogation metrics. The executive workbench may include a dashboard and generate reports that aggregate claims data and present different metrics in a user-friendly fashion. The reports generated on the executive workbench may be stored in the workbench data 130. The workbench module 120 may also provide an administrative workbench which may be used by system administrators to configure system security, access and other parameters.

FIG. 2 illustrates a method 200 of insurance claims processing for detecting insurance claims fraud and subrogation potential claim, in accordance with an embodiment of the present subject matter. Further, the method 200 may identify at least one of insurance claims fraud and subrogation potential claims in an insurance industry. The method 200 may be described in the general context of computer executable instructions. Generally, the computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 202, claims data is extracted from one or more data sources. The one or more data sources may include internal and external data storage systems in an insurance organization, imaged content which contains photos and scanned copies of claim related information, speech converted to text and web content. In one implementation, the data acquisition module 114 extracts the claims data from database of insurance companies and web content.

At block 204, the claims data extracted from one or more data sources is combined to obtain a consolidated claims record having text data. In one implementation, the data acquisition module 114 combines the claims data and obtain the consolidated claims record which provides a 360 degree view of claims.

At block 206, noise is removed from the text data of the consolidated claims record and a claim dataset is obtained. The noisy text data may be defined as errors, such as grammatical mistake, spelling mistakes and punctuation mistakes present in the claims data. The claim dataset may include a plurality of claims. In one implementation, the analysis module 116 removes the noise from the text data of the consolidated claims record.

At block 208, one or more suspicion indicators are ascertained in the plurality of claims based on an analytical technique. The analytical technique may include a text analysis, a predictive model analysis, a link analysis, business rules analysis, a social-media analysis, and a combination thereof. In one implementation, the analysis module 116 may perform at least one of the text analysis, the predictive model analysis, the link analysis, business rules analysis, and the social-media analysis to identify the one or more suspicion indicators in the plurality of claims.

At block 210, a score is assigned to each of the plurality of claims based on at least one scoring rule. The score is an indicative of level of suspicion of a claim. In an example, higher the score, higher may be the level of suspicion. The scoring rule comprises one or more scoring parameters, which may be defined as the combination of rule name, client, LOB, suspicion indicators, claims funnel and the claim filtration criteria. In one implementation, the scoring module 118 may assign the score to each of the plurality of claims.

At block 212, at least one of insurance claims fraud and subrogation potential claims is identified based on the score assigned to the one or more suspicion indicators. The higher the score the higher is the probability of insurance claims fraud or subrogation potential claims. In one implementation, the scoring module 118 may identify at least one of the insurance claims fraud and the subrogation potential claims based on the scores assigned to the one or more suspicion indicators.

The systems and the methods for insurance claims processing of the present subject matter provides a generic solution which may be used for fraud detection, subrogation potential claims identification using analytics in insurance as well as other domains such as healthcare, banking and financial industries. The use of the dictionary helps in achieving higher accuracy with insights from unstructured text data being made available for automated analysis. Further, predictive modeling is used to build models using data mining techniques as well as keep the dictionary up to date which ensures that the score is of higher accuracy. The present subject matter allows the business users to create rules and review the reasons for claim scores, hides the complexity of analytics from users and makes the solution user friendly.

Although embodiments for systems and methods for insurance claims processing have been described in language specific to structural features and/or methods, it is to be understood that the invention is not necessarily limited to the specific features or methods described. Rather, the specific features and methods are disclosed as exemplary implementations for detecting insurance claims fraud and subrogation potential claims.

We claim:

1. A system for identifying insurance claims fraud and subrogation potential claims, the system comprising:
   a processor;
   a memory coupled to the processor, wherein the processor executes a plurality of modules stored in the memory, and wherein the plurality of modules comprising a data acquisition module configured to,
      extract claims data from one or more data source, wherein the claims data includes structured data and unstructured data, and wherein the unstructured data includes imaged content and speech data;
      convert the imaged content and the speech data to a textual format, wherein the imaged content includes photos and scanned copies of claim related information;
      combine the claims data, having the textual format of the imaged content and the speech data, to obtain a consolidated claims record having text data, wherein data, from the claims data, in a language different from a language used in most of the claims data is translated to the language used in most of the claims data; and
      remove noise from the text data of the consolidated claims records to obtain a claim dataset, wherein the claim dataset includes a plurality of claims;
   an analysis module configured to ascertain one or more suspicion indicators in the plurality of claims based on concepts obtained from a fraud dictionary using one or more analytical technique, wherein the concepts are at least one of words, phrases, and entities that indicate suspicious claims; and a scoring module configured to, assign a score to each of the plurality of claims based on at least one scoring rule comprising one or more scoring parameters, wherein the score is indicative of a level of suspicion of a claim; and identify at least one of insurance claims fraud and subrogation potential claims based on the score assigned to each of the plurality of claims.

2. The system as claimed in claim 1, wherein the noise comprises at least one of grammatical mistake, spelling mistakes, and punctuation mistakes.

3. The system as claimed in claim 1, wherein the one or more analytic technique is comprises a text analysis, a predictive model analysis, a link analysis, a business rules analysis, and a social-media analysis, and wherein the text analysis uses at least one text pattern to identify the suspicion indicators, and wherein the link analysis uses suspicious links between entities of two different claims to identify the suspicion indicators, and wherein the business rules analysis uses business rules to identify the suspicion indicators, and wherein the social-media analysis uses social-media content and social-media links between entities involved in a claim, from the among the plurality of claims, to identify the suspicion indicators in the claim.

4. The system as claimed in claim 1, wherein the scoring module is configured to create the at least one scoring rule for a specific client and a line of business (LOB).

5. The system as claimed in claim 1, wherein the fraud dictionary includes the at least one text pattern, the business rules, rules for identifying the suspicious links between entities of two different claims, and rules for identifying the social-media content and the social-media links.

6. The system as claimed in claim 1, wherein the scoring module is configured to update the dictionary based on a line of business (LOB).

7. The system as claimed in claim 1, wherein the scoring module is configured to recalculate the score upon receiving new information related to the plurality of claims.

8. The system as claimed in claim 1, wherein the scoring module is configured to categorize the plurality of claims into one or more categories based on the score assigned to each of the plurality of claims.

9. The system as claimed in claim 1 further comprising a workbench module coupled to the processor, the workbench module is configured to generate reports having the claims data.

10. The system as claimed in claim 9, wherein the workbench module is configured to illustrate the one or more suspicion indicators in the plurality of claims upon receiving a drill down request from a fraud analyst.

11. The system of claim 1, wherein the fraud dictionary is updated over a period of time by adding new concepts, wherein the new concepts are generated by means of machine learning techniques to learn new patterns from the at least one of insurance claims fraud and subrogation potential claims so identified.

12. A method for identifying insurance claims fraud and subrogation potential claims in an insurance industry, the method comprising:

extracting, by a processor, claims data from one or more data sources, wherein the claims data includes structured data and unstructured data, and wherein the unstructured data includes imaged content and speech data;

converting, by the processor, the imaged content and the speech data to a textual format, wherein the imaged content includes photos and scanned copies of claim related information;

combining, by the processor, the claims data, having the textual format of the imaged content and the speech data, to obtain a consolidated claims record having text data, wherein data, from the claims data, in a language different from a language used in most of the claims data is translated to the language used in most of the claims data;

removing, by the processor, noise from the text data of the consolidated claims records to obtain a claim dataset, wherein the claim dataset includes a plurality of claims;

ascertaining, by the processor, one or more suspicion indicators in the plurality of claims based on concepts obtained from a fraud dictionary using one or more analytical technique, wherein the concepts are at least one of words, phrases, and entities that indicate suspicious claims;

assigning, by the processor, a score to each of the plurality of claims based on at least one scoring rule comprising one or more scoring parameters, wherein the score is an indicative of a level of suspicion of a claim; and identifying, by the processor, at least one of insurance claims fraud and subrogation potential claims based on the score assigned to each of the plurality of claims.

13. The method as claimed in claim 12, wherein the one or more data sources include at least one of internal and external data storage systems in an insurance organization, the imaged content which contains the photos and the scanned copies of the claim related information, the speech content, and web content.

14. The method as claimed in claim 12, wherein the one or more analytical technique is at least one of a text analysis, a predictive model analysis, a link analysis, business rules analysis, and a social-media analysis, and wherein the text analysis uses at least one text pattern to identify the suspicion indicators, and wherein the link analysis uses suspicious links between entities of two different claims to identify the suspicion indicators, and wherein the business rules analysis uses business rules to identify the suspicion indicators, and wherein the social-media analysis uses social-media content and social-media links between entities involved in a claim, from the among the plurality of claims, to identify the suspicion indicators in the claim.

15. The method as claimed in claim 14, wherein the fraud dictionary includes the at least one text pattern, the business rules, rules for identifying the suspicious links between entities of two different claims, and rules for identifying the social-media content and the social-media links.

16. The method as claimed in claim 12, wherein the one or more scoring parameters are a combination of at least one of rule name, client, line of business (LOB), suspicion indicators, claim filtration criteria, and claims funnel.

17. A non-transitory computer-readable medium having embodied thereon a computer program executable in a computing device for executing a method of identifying insurance claims fraud and subrogation potential claims, the method comprising:

extracting claims data from one or more data sources, wherein the claims data includes structured data and unstructured data, and wherein the unstructured data includes imaged content and speech data;

converting the imaged content and the speech data to a textual format, wherein the imaged content includes photos and scanned copies of claim related information;

combining the claims data, having the textual format of the imaged content and the speech data, to obtain a consolidated claims record having text data, wherein data, from the claims data, in a language different from a language used in most of the claims data is translated to the language used in most of the claims data;

removing noise from the text data of the consolidated claims records to obtain a claim dataset, wherein the claim dataset includes a plurality of claims;

ascertaining one or more suspicion indicators in the plurality of claims based on concepts obtained from a fraud dictionary using one or more analytical technique, wherein the concepts are at least one of words, phrases, and entities that indicate suspicious claims;

assigning a score to each of the plurality of claims based on at least one scoring rule comprising one or more scoring parameters, wherein the score is an indicative of a level of suspicion of a claim; and identifying at least one of insurance claims fraud and subrogation potential claims based on the score assigned to each of the plurality of claims.

18. The non-transitory computer readable medium as claimed in claim 17, wherein the one or more analytical technique comprises a text analysis, a predictive model analysis, a link analysis, business rules analysis, and a social-media analysis, and wherein the text analysis uses at least one text pattern to identify the suspicion indicators, and wherein the link analysis uses suspicious links between entities of two different claims to identify the suspicion indicators, and wherein the business rules analysis uses business rules to identify the suspicion indicators, and wherein the social-media analysis uses social-media content and social-media links between entities involved in a claim, from the among the plurality of claims, to identify the suspicion indicators in the claim.

19. The non-transitory computer readable medium as claimed in claim 17, wherein the one or more scoring parameters are a combination of at least one of rule name, client, line of business (LOB), suspicion indicators, claim filtration criteria, and claims funnel.

20. The non-transitory computer readable medium as claimed in claim 17, wherein the plurality of claims are categorized into one or more categories based on the score assigned to each of the plurality of claims.

* * * * *